G. W. TRENT.
COMBINED RAIL JOINT AND NUT LOCK.
APPLICATION FILED JUNE 7, 1910.
1,019,928. Patented Mar. 12, 1912.
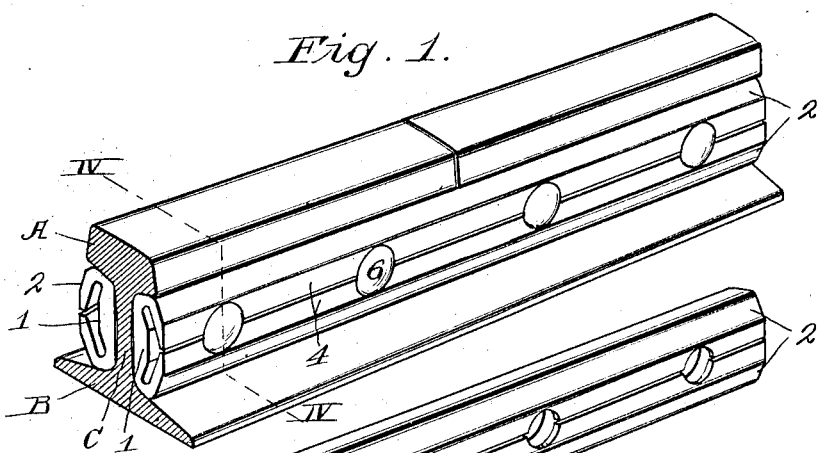
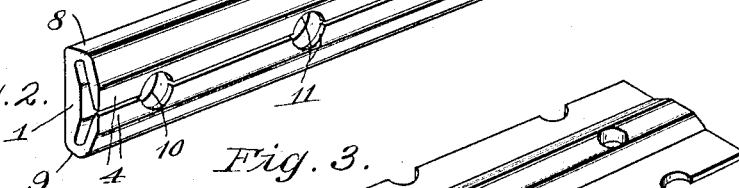
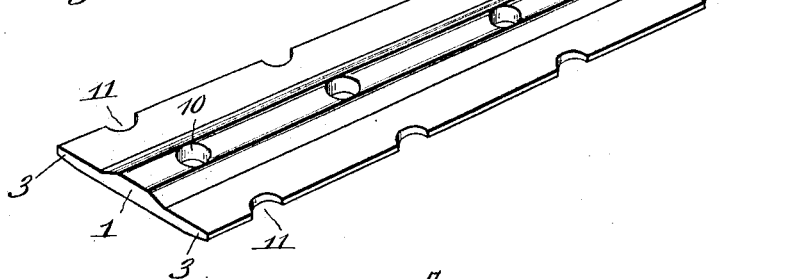
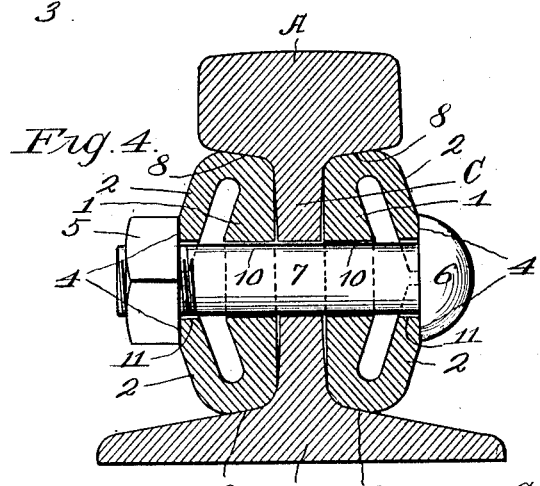
WITNESSES:
R. E. Hamilton
M. Cox
INVENTOR:
George W. Trent,
BY F. G. Fischer,
ATTORNEY.

UNITED STATES PATENT OFFICE.

GEORGE W. TRENT, OF LANSING, KANSAS.

COMBINED RAIL-JOINT AND NUT-LOCK.

1,019,928.  Specification of Letters Patent.  Patented Mar. 12, 1912.

Application filed June 7, 1910. Serial No. 565,634.

*To all whom it may concern:*

Be it known that I, GEORGE W. TRENT, a citizen of the United States, residing at Lansing, in the county of Leavenworth and State of Kansas, have invented certain new and useful Improvements in Combined Rail-Joints and Nut-Locks, of which the following is a specification.

My invention relates to a combined rail-joint and nut-lock, and my object is to provide a strong, simple device of this character whereby not only the ends of two abutting rails may be readily secured together, but which also forms a lock for the nuts on the bolts used in securing the device to the rails.

The twin members, forming the invention, are of such shape that they may be either rolled or cast, and in order that said invention may be fully understood, reference will now be made to the accompanying drawing, in which:

Figure 1 is a perspective showing the devices in position on two abutting rails. Fig. 2 is a detail perspective of one of the devices. Fig. 3 is a perspective of one of the devices perparatory to bending the resilient wings toward each other. Fig. 4 is an enlarged transverse section on line IV—IV of Fig. 1.

The rails are of ordinary construction, and consist of balls A, bases B, and webs C, connecting the balls and the bases.

Each device consists of a body portion 1 tapering toward its upper and lower portions, and provided with integral wings 2 bent toward each other, and having tapering longitudinal margins 3, to form flat bearing surfaces 4 for nuts 5 and heads 6 of bolts 7 employed in securing the devices to the rails. The upper and lower edges 8 and 9, respectively, of each device, are inclined to snugly fit the undersides of balls A and bases B, so that the devices will reinforce the rails at their jointed portions, and assist them in resisting vertical and lateral strains.

Body portion 1 has a series of holes 10, and wings 2 have each a series of marginal recesses 11 for the passage of the bolts 7.

Wings 2 are thinner than the body portion 1 to render them resilient so that when forced toward the body portion by screwing up the nuts 5, they will have a tendency to spring outward away from the body portion and thus reliably lock the nuts and prevent the same from becoming loose on the bolts.

When the devices are in position on the rails the outer sides of the wings are substantially flush with the sides of the rail balls, so that they will not project into the path of the wheel flanges traveling over said rails.

In practice the nuts 5 are screwed upon the bolts 7, sufficiently tight to hold the devices firmly against the rails and to tension the wings 2 by forcing the same inward toward the body portions 1. Then should the bolts expand the wings will correspondingly expand or spring outward, and exert sufficient pressure upon the nuts 5 and the bolt-heads 6 to prevent said bolts or the nuts from becoming loose. Should the bolts contract the wings will correspondingly contract or yield and thus prevent the threads on the bolts and the nuts from becoming stripped therefrom, as would be the case, were the wings unyielding.

From the foregoing description it will be understood that the devices are reliably held against the rails, and the bolts and nuts are prevented from becoming loose by the resilient wings, which as above stated readily accommodate themselves to any expansion or contraction of said bolts.

Having thus described my invention, what I claim is:—

In combination, two rails, bolts extending therethrough, nuts engaging the threaded ends of said bolts, twin devices consisting of body portions adapted to fit against the balls and bases of said rails, said body portions having holes for the passage of the bolts, and resilient wings bent downward and upward, respectively, from the upper and lower portions of the body portions, and having marginal recesses for the passage of the bolts and tapering toward their longitudinal margins to form flat bearing surfaces for the nuts and the heads of the bolts, said wings being substantially flush with the sides of the rail balls, for the purpose described.

In testimony whereof I affix my signature, in the presence of two witnesses.

GEORGE W. TRENT.

Witnesses:
 M. J. AARON,
 CHAS. JENNINGS.

Copies of this patent may be obtained for five cents each, by addressing the "Commissioner of Patents, Washington, D. C."